United States Patent
Matsumoto et al.

(10) Patent No.: US 12,498,059 B2
(45) Date of Patent: Dec. 16, 2025

(54) ELECTRIC RESISTANCE WELDED STEEL PIPE AND METHOD FOR MANUFACTURING THE SAME

(71) Applicant: JFE Steel Corporation, Tokyo (JP)

(72) Inventors: Atsushi Matsumoto, Tokyo (JP); Ryo Nakazawa, Tokyo (JP); Jun Yasuda, Tokyo (JP); Eiichi Urahata, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 729 days.

(21) Appl. No.: 17/777,115

(22) PCT Filed: Nov. 11, 2020

(86) PCT No.: PCT/JP2020/042132
§ 371 (c)(1),
(2) Date: May 16, 2022

(87) PCT Pub. No.: WO2021/106577
PCT Pub. Date: Jun. 3, 2021

(65) Prior Publication Data
US 2022/0390044 A1  Dec. 8, 2022

(30) Foreign Application Priority Data
Nov. 29, 2019  (JP) .................................. 2019-216134

(51) Int. Cl.
*F16L 9/17*  (2006.01)
*B23K 11/06*  (2006.01)

(52) U.S. Cl.
CPC .............. *F16L 9/17* (2013.01); *B23K 11/066* (2013.01)

(58) Field of Classification Search
CPC ..................................... C21D 9/50; F16L 9/17
See application file for complete search history.

(56) References Cited

U.S. PATENT DOCUMENTS 6,364,968 B1   4/2002  Yasuhara et al.
2014/0299236 A1  10/2014  Anelli et al.
(Continued)

FOREIGN PATENT DOCUMENTS

CN   102308013         1/2012
DE   102017110631 A1  11/2018
(Continued)

OTHER PUBLICATIONS

Chinese Office Action with Search Report for Chinese Application No. 202080079819.5 dated Jan. 19, 2023, 9 pages.
(Continued)

*Primary Examiner* — Adam Krupicka
(74) *Attorney, Agent, or Firm* — Buchanan Ingersoll & Rooney PC

(57) ABSTRACT

An electric resistance welded steel pipe, and a method for manufacturing the same are provided. An electric resistance welded steel pipe has a welded portion that includes a heat-affected zone having a steel microstructure principally including a bainitic ferrite phase and/or a bainite phase. The steel microstructure at half the wall thickness includes a bainitic ferrite phase and/or a bainite phase in a total area ratio of 90% or more. In the steel microstructure located 1 mm in the wall thickness direction, the bainitic ferrite phase and/or the bainite phase has an average grain size of 20 μm or less. The average grain size of the bainitic ferrite phase and/or the bainite phase located 1 mm in the wall thickness direction is 0.5 times or more and 2 times or less the average grain size of the bainitic ferrite phase and/or the bainite phase at half the wall thickness.

10 Claims, 2 Drawing Sheets

(56) References Cited

U.S. PATENT DOCUMENTS

| | | |
|---|---|---|
| 2016/0153063 A1 | 6/2016 | Goto et al. |
| 2017/0369962 A1 | 12/2017 | Goto et al. |
| 2020/0165693 A1 | 5/2020 | Günster et al. |
| 2020/0385839 A1 | 12/2020 | Kimura et al. |

FOREIGN PATENT DOCUMENTS

| | | |
|---|---|---|
| EP | 1 462 535 A1 | 9/2004 |
| EP | 1 568 792 A1 | 8/2005 |
| EP | 2395122 | 12/2011 |
| EP | 2505681 A1 | 10/2012 |
| EP | 3020840 A1 | 5/2016 |
| EP | 3 225 709 A1 | 10/2017 |
| EP | 3 239 317 A1 | 11/2017 |
| EP | 3239316 A1 | 11/2017 |
| EP | 3246427 A1 | 11/2017 |
| EP | 3 299 485 A1 | 3/2018 |
| JP | S59-129729 A | 7/1984 |
| JP | 05051648 A | 3/1993 |
| JP | H06-220547 A | 8/1994 |
| JP | H09-227945 A | 9/1997 |
| JP | 4105796 B2 | 6/2008 |
| JP | 5217773 B2 | 6/2013 |
| JP | 5708723 B2 | 4/2015 |
| JP | 2019-031698 A | 2/2019 |
| WO | 2016103624 A1 | 6/2016 |
| WO | 2018216638 A1 | 11/2018 |
| WO | 2019131100 A1 | 7/2019 |

OTHER PUBLICATIONS

International Search Report and Written Opinion for International Application No. PCT/JP2020/042131, dated Jan. 19, 2021, 5 pages.

"Standard Test Methods and Definitions for Mechanical Testing of Steel Products", ASTM A370 / ASME SA-370, Technical Literature, www.metalspiping.com, approved May 1, 2016, 48 pages.

Canadian Examination Report for Application No. 3,157,041 dated Jul. 26, 2023, 6 pages.

Goto et al., "Control of Microstructures and the Practical Properties of API X80 Grade Heavy-Wall High-Frequency Electric Resistance-Welded Pipe with Excellent Low-Temperature Toughness" The Minerals, Metals & Materials Society and ASM International, (Jul. 26, 2017), vol. 48, pp. 5075-5084.

Han et al., "Influence of Post-Weld Heat Treatment on the Microstructure, Microhardness, and Toughness of a Weld Metal for Hot Bend" Metals, (Mar. 2016), vol. 6, No. 4, pp. 1-11.

Kawabata et al., "High Strength X80 Grade Steel Line Pipe with Superior Weldability and Improved Resistance to Unstable Ductile Fracture" Kawasaki Steel Giho, (Month unknown 1992), vol. 24, No. 4, pp. 301-306, with English translation. (21 pages).

Nakata et al., "API X80 Grade Electric Resistance Welded Pipe with Excellent Low Temperature Toughness" JFE Technical Report, (Mar. 2013), No. 18, pp. 12-17.

Communication of a Notice of Opposition issued Dec. 19, 2024, by the European Patent Office in corresponding European Patent Application No. 20894228.4-1103. (29 pages).

Chinese Office Action with Concise Statement of Relevance for Chinese Application No. 202080079819.5, dated Apr. 13, 2023, with partial English translation, 4 pages.

Yan, P. et al., "Crystallographic Texture of Induction-Welded and Heat-Treated Pipeline Steel," Advanced Materials Research, Jan. 1, 2010, 7 pages, vol. 89-91, XP055944158.

Kostryzhev, A. et al., "Mechanical Property Development during UOE Forming of Large Diameter Line-Pipe Steels," Dec. 31, 2008, 9 pages, XP055944159, Retrieved from the Internet: https://www.researchgate.net/publication/261070491_Mechanical_property_development_during_UOE_forming_of_large_diameter_line_pipe_steels [retrieved on Jul. 19, 2022].

Extended European Search Report for European Application No. 20 894 228.4, dated Jul. 27, 2022, 12 pages.

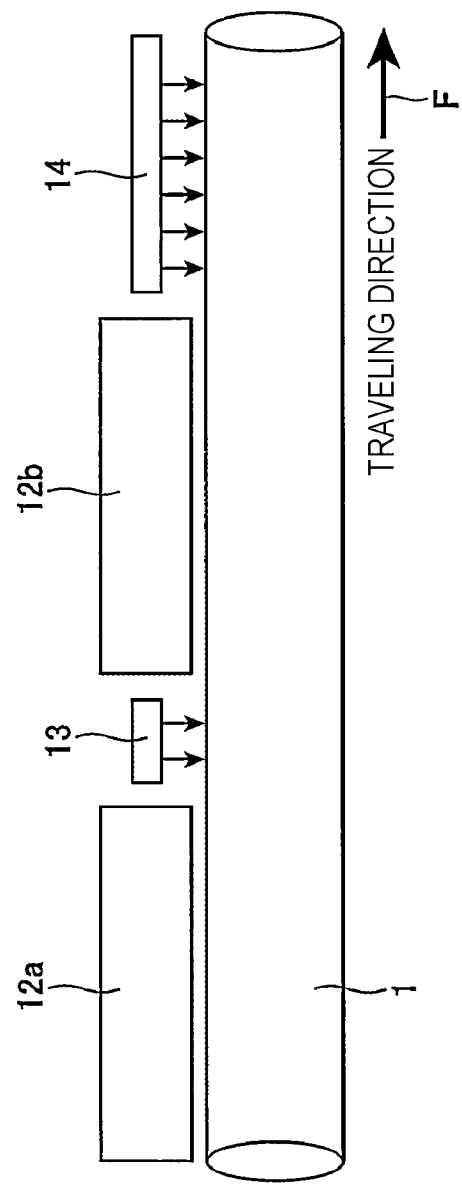

ELECTRIC RESISTANCE WELDED STEEL PIPE AND METHOD FOR MANUFACTURING THE SAME

CROSS REFERENCE TO RELATED APPLICATIONS

This is the U.S. National Phase application of PCT/JP2020/042132, filed Nov. 11, 2020 which claims priority to Japanese Patent Application No. 2019-216134, filed Nov. 29, 2019, the disclosures of these applications being incorporated herein by reference in their entireties for all purposes.

FIELD OF THE INVENTION

The present invention relates to an electric resistance welded steel pipe and a method for manufacturing the same.

BACKGROUND OF THE INVENTION

An electric resistance welded steel pipe is produced by cold roll forming a hot-rolled steel strip (or a hot-rolled steel plate), then locally melting end faces on both sides in the width direction of the steel strip by electric resistance heating (or induction heating), and welding the end faces together while applying pressure through squeeze rolls. Because the welded portion is a quenched microstructure, the welding is followed by heat treatment of the welded portion to control the steel microstructure so as to obtain desired mechanical characteristics (properties) of the welded portion such as strength and toughness. The heat treatment of the welded portion mainly consists of quenching and tempering by induction heating on the outer surface side of the welded portion with an induction heater and forced water cooling.

Larger thickness is increasingly required of electric resistance welded steel pipes, particularly those for line pipes. A thick-walled electric resistance welded steel pipe requires excellent toughness to be resistant to fracture occurring from the welded part. To attain such toughness, heating and cooling of the inner surface side of the welded portion is done by thermal conduction from the outer surface side by the heat treatment of the welded portion as described above. However, a temperature deviation is present in the thickness direction of the welded portion that is being heated. As a result, the increase in wall thickness of a steel pipe (an electric resistance welded steel pipe) increases the temperature deviation between the outer surface and the inner surface of the steel pipe, thus making it difficult for the inner surface of the welded portion to reach the target temperature. An approach to this problem is that when a welded portion of a thick-walled material is heat-treated with a limited number of induction heaters, the heating temperature for the outer surface of the steel pipe is increased to transfer more heat to the inner surface of the steel pipe so that the inner surface will reach the target temperature. However, the outer surface of the steel pipe is overheated, and negative effects are caused such as coarsening of the steel microstructure and deterioration in toughness.

From the foregoing, obtaining desired characteristics at a welded portion requires appropriate control of the thermal history of the outer and inner surfaces of the steel pipe during heat treatment of the welded portion. For example, such control of thermal history is addressed in Patent Literatures 1 to 3.

Patent Literature 1 discloses a method in which a welded portion is heated to an $Ac_3$ transformation temperature or above and 1050° C. or below, and when the outer surface temperature of the welded portion is from 800° C. to 500° C. or 400° C., the welded portion is cooled at a cooling rate that is not less than 10° C./sec and which allows ferrite precipitation, and when the outer surface temperature of the welded portion has reached 500° C. to 400° C., the welded portion is cooled at a higher rate to an outer surface temperature of the welded portion of 200° C. or below.

Patent Literature 2 discloses a method in which a welded portion is heated to 800° C. to 1000° C. and is quenched from a temperature equal to or higher than the $Ar_3$ transformation temperature to a temperature equal to or lower than the $Ar_1$ transformation temperature at a cooling rate of 20° C./sec to 200° C./sec so as to leave retained austenite in the microstructure of the electric resistance welded portion.

Patent Literature 3 discloses a method in which an electric resistance welded portion is heat-treated so that temperatures at locations in the thickness direction of the welded portion are in the range of 850 to 1150° C., and is cooled to a cooling stop temperature of 550° C. or below in such a manner that the temperatures at locations in the thickness direction of the electric resistance welded portion are lowered at an average cooling rate in the range of 10 to 70° C./s.

PATENT LITERATURE

PTL 1: Japanese Unexamined Patent Application Publication No. 5-51648
PTL 2: Japanese Patent No. 4105796
PTL 3: Japanese Patent No. 5708723

SUMMARY OF THE INVENTION

The methods according to the techniques of Patent Literatures 1 to 3 control the microstructure by controlling the cooling rate and the cooling stop temperature. Further, in Patent Literatures 1 to 3, the electric resistance welded portion is heated by high-frequency heating on one surface on the outer side of the steel pipe. This heating is repeated until the inner surface of the welded portion reaches the target temperature. In this heating step, the outer surface of the steel pipe is held at a high temperature for a long time, and grains in the heat-affected zone grow and are coarsened. As a result, brittle fracture tends to occur starting from the outer surface of the heat-affected zone including such coarse grains.

To ensure that the inner surface of a welded portion of a thick-walled material will be heated to the target temperature as described above, an increased number of induction heaters are necessary to heat the steel at increased number of times. However, it is often impossible to install additional induction heaters due to the space problem in the facility caused by the sizes of the terminals and power supply panels of the induction heaters. In such cases, the outer surface of the welded portion is necessarily heated at a temperature above the suitable range in order to bring the inner surface of the welded portion to the target temperature at the cost of deterioration in toughness of the welded portion.

Aspects of the present invention has been made in view of the problems discussed above. It is therefore an object according to aspects of the present invention to provide a thick-walled electric resistance welded steel pipe that has excellent toughness at the outer surface of a heat-affected zone of a welded portion as a result of the welded portion having been heat-treated under predetermined conditions.

Another object according to aspects of the present invention is to provide a method for manufacturing such an electric resistance welded steel pipe.

The "excellent toughness" as used in accordance with aspects of the present invention means that the absorbed energy in a Charpy impact test at 0° C. is 100 J or more as measured by the method described later in EXAMPLES with respect to a region in the vicinity of the outer surface of a heat-affected zone of a welded portion that is liable to brittle fracture. The term "thick-walled" as used in accordance with aspects of the present invention means that the wall thickness of a steel pipe is 12 mm or more and 25 mm or less. The outer surface and the inner surface mean the external surface and the internal surface of a steel pipe, respectively.

The present inventors carried out extensive studies to solve the problems discussed above that are encountered in a heat-affected zone of a welded portion. Specifically, the present inventors studied approaches in consideration of the importance that the occurrence of a coarse microstructure during heat treatment of a welded portion should be suppressed even in the case where the heating temperature for the outer surface of the welded portion is raised above predetermined temperature range for the purpose of increasing the amount of heat transferred to the inner surface side of the welded portion. As a result, the present inventors have found the following.

A coarse microstructure (a coarse steel microstructure) formed by overheating of the outer surface of a welded portion is temporarily transformed by cooling from austenite phase to bainitic ferrite phase and/or bainite phase. The bainitic ferrite phase and/or the bainite phase is then transformed to austenite phase by reheating. The present inventors have conceived a technical idea that the refinement of steel microstructure occurring during the above process will prevent coarsening of the microstructure in a surface layer portion of the outer surface of the heat-affected zone of the welded portion.

Further, the above cooling of the outer surface of the welded portion is stopped at a temperature that is controlled so that cooling will be confined exclusively on a surface layer portion of the outer surface of the heat-affected zone of the welded portion containing a coarse microstructure. The present inventors have conceived a technical idea that the cooling by thermal conduction in the above manner will have small influence on the inner surface side of the welded portion.

When a welded portion is heated by thermal conduction from the outer surface side of the welded portion, the temperature difference between the outer surface and the inner surface should be large in order to efficiently increase the temperature of the inner surface. In consideration of this, a welded portion heat treatment step having a plurality of stages of induction heaters is divided into a plurality of heating steps. Specifically, the outer surface of a welded portion is effectively heated at a high temperature in an upstream stage of the welded portion heat treatment step, and the outer surface of the welded portion is effectively heated in a downstream stage of the welded portion heat treatment step at a range of temperatures that are equal to or higher than the $Ac_3$ transformation temperature, for example, equal to or higher than 900° C., and do not cause coarsening of the steel microstructure. The present inventors have conceived a technical idea that by performing the welded portion heat treatment in the above manner, a welded portion having a reduced amount of coarse microstructure in the outer surface of a heat-affected zone will be obtained.

The present inventors have also found that the amount of coarse microstructure in the outer surface can be further reduced by controlling the downstream heating so that the inner surface temperature of the welded portion will reach a predetermined temperature.

Aspects of the present invention are based on the above findings. A summary according to aspects of the present invention is as described below.

[1] An electric resistance welded steel pipe, wherein
the electric resistance welded steel pipe has a welded portion including a heat-affected zone having a steel microstructure principally including a bainitic ferrite phase and/or a bainite phase,
the steel microstructure at half the wall thickness of the heat-affected zone of the welded portion includes a bainitic ferrite phase and/or a bainite phase in a total area ratio of 90% or more relative to the entire microstructure at half the wall thickness of the heat-affected zone of the welded portion,
in the steel microstructure located 1 mm in the wall thickness direction below the outer surface of the heat-affected zone of the welded portion, the bainitic ferrite phase and/or the bainite phase has an average grain size of 20 μm or less, and
the average grain size of the bainitic ferrite phase and/or the bainite phase located 1 mm in the wall thickness direction below the outer surface of the heat-affected zone of the welded portion is 0.5 times or more and 2 times or less the average grain size of the bainitic ferrite phase and/or the bainite phase at half the wall thickness of the heat-affected zone of the welded portion.

[2] The electric resistance welded steel pipe described in [1], wherein the absorbed energy in a Charpy impact test at 0° C. is 100 J or more as measured with respect to a region extending from a location 1 mm in the wall thickness direction below the outer surface of the welded portion to a location 11 mm in the wall thickness direction below the outer surface of the welded portion.

[3] The electric resistance welded steel pipe described in [1] or [2], wherein the chemical composition of a base steel portion includes, on mass % basis, C: 0.02 to 0.10%, Si: 0.05 to 0.30%, Mn: 0.80 to 2.00%, P: 0.030% or less, S: 0.0050% or less, Nb: 0.010 to 0.100%, Ti: 0.001 to 0.025%, and Al: 0.01 to 0.08%, the balance being Fe and incidental impurities.

[4] The electric resistance welded steel pipe described in [3], wherein the chemical composition further includes one, or two or more selected from, on mass % basis, Cu: 0.50% or less, Ni: 0.50% or less, Cr: 0.50% or less, Mo: 0.50% or less, V: 0.10% or less, and Ca: 0.0050% or less.

[5] A method for manufacturing an electric resistance welded steel pipe, including:
forming and electric resistance welding a steel material,
heating the outer surface of a welded portion to a temperature of 1000° C. or above and 1400° C. or below,
cooling the outer surface of the welded portion to $Ac_1$ transformation temperature or below at an average cooling rate of 20° C./sec or more and 200° C./sec or less, and
reheating the outer surface of the welded portion to a temperature of 900° C. or above and 1120° C. or below.

[6] The method for manufacturing an electric resistance welded steel pipe described in [5], wherein the reheating is performed to bring the temperature of the inner surface of the welded portion to $Ac_3$ transformation temperature or above.

[7] The method for manufacturing an electric resistance welded steel pipe described in [5] or [6], wherein the reheating is followed by quenching of the outer surface of the welded portion under conditions in which average cooling rate: 20° C./sec or more and 70° C./sec or less, and cooling stop temperature: 300° C. or above and 550° C. or below.

The electric resistance welded steel pipe according to aspects of the present invention has excellent toughness at a welded portion of the steel pipe as a result of suppressed coarsening of the microstructure in a surface layer portion of the outer surface of the heat-affected zone of the welded portion. The method according to aspects of the present invention can manufacture such an electric resistance welded steel pipe.

BRIEF DESCRIPTION OF THE DRAWINGS

FIG. 2 is a view illustrating a welded portion heat treatment step according to an embodiment of the present invention.

DETAILED DESCRIPTION OF EMBODIMENTS OF THE INVENTION

Figure 1:
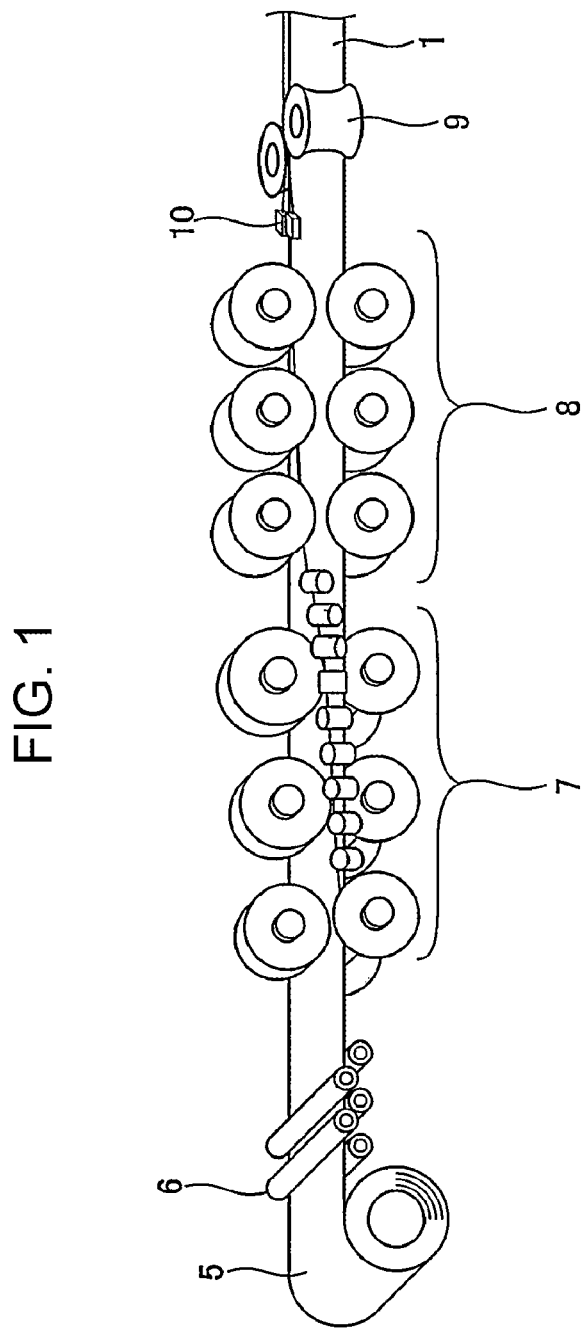
FIG. 1 is a view illustrating a pipe production step according to an embodiment of the present invention.

Embodiments of the present invention will be described in detail hereinbelow. The present invention is not limited to the embodiments described below.

First, an electric resistance welded steel pipe according to aspects of the present invention will be described.

As will be described later, the electric resistance welded steel pipe according to aspects of the present invention is made of a steel strip (or a hot-rolled steel plate) coiled into a coil. This steel material is formed with a plurality of rolls into a substantially cylindrical open pipe. The intermediate pipe is then subjected to a pipe production step in which it is electric resistance welded, and subsequently the electric resistance welded portion is heat-treated. The electric resistance welded steel pipe according to aspects of the present invention has a base steel portion and a welded portion (an electric resistance welded portion) extending in the pipe axis direction. In accordance with aspects of the present invention, the "welded portion" indicates a weld metal, namely, a weld junction, in a region where the opposed end faces of an open pipe are pressure-welded in the pipe production step described later, and a heat-affected zone of welding. The "base steel portion" indicates a region other than the welded portion.

Here, the chemical composition of the base steel portion, and the steel microstructure of the welded portion will be sequentially described.

The chemical composition of the base steel portion of the electric resistance welded steel pipe according to aspects of the present invention will be described. Note that "%" representing the contents in the chemical composition means "mass %".

The base steel portion preferably has a chemical composition including, on mass % basis, C: 0.02 to 0.10%, Si: 0.05 to 0.30%, Mn: 0.80 to 2.00%, P: 0.030% or less, S: 0.0050% or less, Nb: 0.010 to 0.100%, Ti: 0.001 to 0.025%, and Al: 0.01 to 0.08%, the balance being Fe and incidental impurities.

C: 0.02 to 0.10%

C is an element that greatly contributes to increasing the strength of steel pipes (electric resistance welded steel pipes). In order to obtain such an effect, the steel preferably contains 0.02% or more C. On the other hand, when the C content exceeds 0.10%, hard phases such as pearlite and martensite are formed easily to give rise to a risk that toughness may be lowered. Further, adding more than 0.10% C excessively increases the strength (hardness) of the bainite phase and may result in a decrease in toughness. Thus, the C content is preferably limited to 0.02 to 0.10%. The C content is more preferably 0.03% or more. The C content is more preferably 0.08% or less. The C content is even more preferably 0.04% or more. The C content is even more preferably 0.07% or less.

Si: 0.05 to 0.30%

Si is an element that is dissolved in steel to contribute to increasing the strength of steel pipes, and also contributes to reducing the amount of scale-off during hot rolling. In order to ensure such effects, the steel preferably contains 0.05% or more Si. Si forms a highly viscous eutectic oxide together with Mn oxide. When the Si content is less than 0.05%, however, the Mn concentration in the eutectic oxide is relatively increased. The melting point of such a eutectic oxide is higher than the temperature of the molten steel, and the oxide tends to remain in the welded portion to cause a decrease in toughness of the welded portion. On the other hand, when the Si content exceeds 0.30%, red scales are markedly formed to deteriorate the appearance of the steel pipe and the steel plate that is the steel pipe material. Further, red scales cause uneven cooling during hot rolling to give rise to a risk that the material uniformity of the steel pipe and the steel plate that is the steel pipe material may be lowered. When the Si content exceeds 0.30%, the Si concentration in the eutectic oxide is relatively increased. The melting point of such a eutectic oxide is higher than the temperature of the molten steel. Further, adding such a large amount of Si increases the amount of the oxide that is formed. As a result, the oxide tends to remain in the welded portion to give rise to a risk that the toughness of the welded portion may be lowered. Thus, the Si content is preferably limited to 0.05 to 0.30%. The Si content is more preferably 0.10% or more. The Si content is more preferably 0.25% or less. The Si content is even more preferably 0.12% or more. The Si content is even more preferably 0.24% or less.

Mn: 0.80 to 2.00%

Mn is dissolved in steel to contribute to increasing the strength of steel pipes by solid solution strengthening. This element also enhances hardenability and thereby contributes to increasing the strength of steel pipes by transformation strengthening and further to enhancing toughness. In order to obtain such effects, the steel preferably contains 0.80% or more Mn. Mn forms a highly viscous eutectic oxide together with Si oxide. When the Mn content is less than 0.80%, however, the Si concentration in the eutectic oxide is relatively increased. The melting point of such an oxide is higher than the temperature of the molten steel, and the oxide tends to remain in the welded portion to give rise to a risk that the toughness of the welded portion may be lowered. On the other hand, when the Mn content is as high as more than 2.00%, the Mn concentration in the eutectic oxide is relatively increased. The melting point of such a eutectic oxide is higher than the temperature of the molten steel. Further, adding such a large amount of Mn increases the amount of the oxide that is formed. As a result, the oxide tends to remain in the welded portion to give rise to a risk that the toughness of the welded portion may be lowered. Further, when the Mn content exceeds 2.00%, the hardenability is excessively enhanced to facilitate the formation of martensitic phase, thus giving rise to a risk that toughness may be lowered. Thus, the Mn content is preferably limited to 0.80 to 2.00%. The Mn content is more preferably 0.90% or more. The Mn content is more preferably 1.80% or less. The Mn content is even more preferably 0.92% or more, and even further more preferably 0.95% or more. The Mn content is even more preferably 1.78% or less.

P: 0.030% or less

P has a high tendency to segregate at grain boundaries, thereby lowering toughness. It is therefore preferable to reduce as much P as possible. Up to 0.030% P is acceptable. Thus, the P content is limited to 0.030% or less. The P content is more preferably 0.025% or less, and even more preferably 0.015% or less. Excessive dephosphorization extends the refining time to raise the manufacturing costs. Thus, the P content is preferably 0.002% or more.

S: 0.0050% or Less

S forms MnS in steel to lower toughness. It is therefore preferable to reduce as much S as possible. Up to 0.0050% S is acceptable. Thus, the S content is preferably limited to 0.0050% or less. The S content is more preferably 0.0040% or less, and even more preferably 0.003% or less. Excessive desulfurization extends the refining time to raise the manufacturing costs. Thus, the S content is preferably 0.002% or more.

Nb: 0.010 to 0.100%

Nb is an element that is finely precipitated as Nb carbonitride during hot rolling in the production of the steel plate (in the production of the steel plate as the steel pipe material), and contributes to increasing the strength of the steel plate that is the steel pipe material (the steel material). Further, Nb suppresses the growth of austenite grains during heat treatment of the welded portion of the electric resistance welded steel pipe, thus contributing to the refinement of the microstructure of the welded portion. In order to ensure such effects, the steel preferably contains 0.010% or more Nb. On the other hand, when the Nb content is as high as more than 0.100%, an increased amount of Nb carbonitride is precipitated to give rise to a risk that the toughness of the steel plate as the steel pipe material, the toughness of the base steel portion of the steel pipe, and the toughness of the welded portion of the steel pipe may be lowered. Thus, the Nb content is preferably limited to 0.010 to 0.100%. The Nb content is more preferably 0.020% or more. The Nb content is more preferably 0.080% or less. The Nb content is even more preferably 0.022% or more, and even further more preferably 0.030% or more. The Nb content is even more preferably 0.078% or less.

Ti: 0.001 to 0.025%

Ti is an element that acts to remove adverse effects of nitrogen by bonding to nitrogen to form TiN. In order to obtain such an effect, the steel preferably contains 0.001% or more Ti. On the other hand, when the Ti content is as high as more than 0.025%, an increased amount of Ti carbonitride is precipitated along cleavage surfaces of iron to give rise to a risk that the toughness of the steel plate as the steel pipe material, the toughness of the base steel portion of the steel pipe, and the toughness of the welded portion of the steel pipe may be lowered. Thus, the Ti content is preferably limited to 0.001 to 0.025%. The Ti content is more preferably 0.005% or more. The Ti content is more preferably 0.015% or less. The Ti content is even more preferably 0.007% or more. The Ti content is even more preferably 0.012% or less.

Al: 0.01 to 0.08%

Al is an element that acts as a deoxidizing agent. In order to ensure such an effect, the steel preferably contains 0.01% or more Al. On the other hand, when the Al content exceeds 0.08%, Al oxide is markedly formed. The Al oxide tends to remain particularly in the welded portion, thus giving rise to a risk that the toughness of the welded portion may be lowered. Thus, the Al content is preferably limited to 0.01 to 0.08%. The Al content is more preferably 0.02% or more. The Al content is more preferably 0.07% or less. The Al content is even more preferably 0.030% or more. The Al content is even more preferably 0.050% or less.

The balance is Fe and incidental impurities. Some acceptable incidental impurities are O (oxygen): 0.0030% or less and N: 0.0050% or less.

The components described above constitute the basic chemical composition. By containing the above essential elements, the electric resistance welded steel pipe according to aspects of the present invention attains the target characteristics. To achieve further enhancements in strength and toughness, the steel in accordance with aspects of the present invention may contain optional elements described below as required in addition to the above basic components.

One, or two or more selected from Cu: 0.50% or less, Ni: 0.50% or less, Cr: 0.50% or less, Mo: 0.50% or less, V: 0.10% or less, and Ca: 0.0050% or less Cu, Ni, Cr and Mo are elements that act to enhance hardenability. One, or two or more selected from these elements may be contained as required.

Cu is an element that enhances hardenability and thereby acts to increase strength and enhance toughness. In order to obtain such effects, the steel desirably contains 0.05% or more Cu. The Cu content is more preferably 0.10% or more. On the other hand, adding more than 0.50% Cu results in the saturation of the above effects and is economically disadvantageous because effects appropriate to the amount added may not be expected. Thus, when Cu is added, the Cu content is preferably limited to 0.50% or less. The Cu content is more preferably 0.35% or less.

Similar to Cu, Ni is an element that enhances hardenability and thereby acts to increase strength and enhance toughness. In order to obtain such effects, the steel desirably contains 0.05% or more Ni, more preferably 0.08% or more Ni. On the other hand, when the Ni content exceeds 0.50%, intergranular oxidation of Fe occurs severely during heating of cast steel (slab) to promote the occurrence of surface defects. Thus, when Ni is added, the Ni content is preferably limited to 0.50% or less. The Ni content is more preferably 0.35% or less.

Similar to Cu and Ni, Cr is an element that enhances hardenability and thereby acts to increase strength and enhance toughness. In order to obtain such effects, the steel desirably contains 0.05% or more Cr, more preferably 0.10% or more Cr. On the other hand, when the Cr content exceeds 0.50%, Cr oxide is formed in the welded portion to cause a significant decrease in toughness of the welded portion. Thus, when Cr is added, the Cr content is preferably limited to 0.50% or less. The Cr content is more preferably 0.30% or less.

Similar to Cu, Ni and Cr, Mo is an element that enhances hardenability and thereby acts to significantly enhance strength and toughness. In order to obtain such effects, the steel desirably contains 0.05% or more Mo. The Mo content is more preferably 0.10% or more. On the other hand, when the Mo content exceeds 0.50%, hard secondary phases described hereinabove are formed easily in the welded portion during heat treatment of the welded portion to cause a decrease in toughness of the welded portion. Thus, when Mo is added, the Mo content is preferably limited to 0.50% or less. The Mo content is more preferably 0.25% or less.

V: 0.10% or Less

V is an element that contributes to increasing the strength of steel pipes and of steel plates that are steel pipe materials, by being dissolved in the steel, namely, by solid solution strengthening, and also by being precipitated as carbide, namely, by precipitation strengthening. In order to ensure such effects, the steel desirably contains 0.005% or more V. The V content is more preferably 0.010% or more. On the other hand, adding more than 0.10% V results in saturated effects and is economically disadvantageous. Thus, when V is added, the V content is preferably limited to 0.10% or less. The V content is more preferably 0.085% or less.

Ca: 0.0050% or Less

Ca is an element that effectively contributes to morphological control of sulfides such as MnS. On the other hand, adding more than 0.0050% Ca results in saturated effects and is economically disadvantageous because effects appropriate to the amount added may not be expected. Further, a large amount of Ca oxide is formed to lower toughness, particularly, the toughness of the welded portion. Thus, when Ca is added, the Ca content is preferably limited to 0.0050% or less. The Ca content is more preferably 0.0035% or less. The Ca content is even more preferably 0.0030% or less. The Ca content is more preferably 0.0010% or more.

Next, the steel microstructure in the welded portion of the electric resistance welded steel pipe according to aspects of the present invention will be described.

The electric resistance welded steel pipe according to aspects of the present invention has a welded portion that includes a heat-affected zone having, at half the wall thickness, a steel microstructure principally including a bainitic ferrite phase and/or a bainite phase. The steel microstructure at half the wall thickness of the heat-affected zone of the welded portion includes a bainitic ferrite phase and/or a bainite phase in a total area ratio of 90% or more relative to the entire microstructure at half the wall thickness of the heat-affected zone of the welded portion. In the steel microstructure located 1 mm in the wall thickness direction below the outer surface of the heat-affected zone of the welded portion, the bainitic ferrite phase and/or the bainite phase has an average grain size of 20 µm or less. The average grain size of the bainitic ferrite phase and/or the bainite phase located 1 mm in the wall thickness direction below the outer surface of the heat-affected zone of the welded portion is 0.5 times or more and 2 times or less the average grain size of the bainitic ferrite phase and/or the bainite phase at half the wall thickness of the heat-affected zone of the welded portion.

The welded portion includes a weld junction and a heat-affected zone around the weld junction. As already mentioned, aspects of the present invention have an object of attaining excellent toughness in the heat-affected zone. To achieve the object, the steel microstructure is specified with respect to locations in the heat-affected zone 2 mm and 4 mm away from the weld junction in the circumferential direction.

The steel microstructure of the heat-affected zone of the welded portion principally includes a bainitic ferrite phase and/or a bainite phase. Here, the "bainitic ferrite phase and/or bainite phase" indicates one or two selected from bainitic ferrite phase and bainite phase. When the microstructure includes both the bainitic ferrite phase and the bainite phase, the effects described below may be obtained as long as both or any one of these phases satisfies the specific conditions.

In accordance with aspects of the present invention, the term principally means that the area ratio is 90% or more relative to the entire microstructure at half the wall thickness of the heat-affected zone of the welded portion. When the total area ratio of the phases described above (bainitic ferrite phase and/or bainite phase) in the steel microstructure is less than 90%, the area ratio of hard phases such as martensite and pearlite increases to cause a failure to obtain the target toughness of the welded portion in accordance with aspects of the present invention.

In the steel microstructure at half the wall thickness of the heat-affected zone, the total area ratio of the bainitic ferrite phase and/or the bainite phase is 90% or more relative to the entire microstructure at half the wall thickness of the heat-affected zone. When the total area ratio is less than 90%, the desired toughness in accordance with aspects of the present invention may not be obtained. Thus, the steel microstructure at half the wall thickness of the heat-affected zone is limited to having a total area ratio of the bainitic ferrite phase and/or the bainite phase of 90% or more. The total area ratio is preferably 93% or more, and even more preferably 95% or more.

The upper limit of the total area ratio of the bainitic ferrite phase and/or the bainite phase is preferably 100% or less, and more preferably 97% or less.

In accordance with aspects of the present invention, the steel microstructure at half the wall thickness of the heat-affected zone may include, in addition to the main microstructure described above, microstructures (hereinafter, also written as "remainder microstructures") such as martensitic phase, pearlite phase and other microstructures (for example, cementite). Such remainder microstructures may be contained as long as the steel microstructure according to aspects of the present invention satisfies the conditions described above. Because these remainder microstructures are hard phases, toughness is significantly deteriorated with increasing content of the remainder microstructures. Thus, the total area ratio of the remainder microstructures is preferably 10% or less, more preferably 3% or less, and even more preferably less than 1%.

In accordance with aspects of the present invention, the area ratios in the steel microstructure of the heat-affected zone may be measured, and the steel microstructure at half the wall thickness of the heat-affected zone may be identified by the method described later in EXAMPLES.

In the steel microstructure located 1 mm in the wall thickness direction below the outer surface of the heat-affected zone of the welded portion, the bainitic ferrite phase and/or the bainite phase has an average grain size of 20 µm or less.

When the bainitic ferrite phase and/or the bainite phase present at a location 1 mm in the wall thickness direction below the outer region of the heat-affected zone of the welded portion (hereinafter, this location may be written as the outer region of the welded portion) has an average grain size of more than 20 µm, the outer region of the heat-affected zone of the welded portion fails to attain the desired toughness according to aspects of the present invention. The average grain size is preferably 16 µm or less, and more preferably 14 µm or less. To reduce the difference in grain size in the microstructure between the outer region and the vicinity at half the wall thickness of the heat-affected zone, the average grain size is preferably 4 µm or more, and more preferably 6 µm or more.

The average grain size of the bainitic ferrite phase and/or the bainite phase located 1 mm in the wall thickness direction below the outer surface of the heat-affected zone of the welded portion is 0.5 times or more and 2 times or less the average grain size of the bainitic ferrite phase and/or the bainite phase at half the wall thickness of the heat-affected zone of the welded portion.

The characteristics of the whole of the welded portion are almost the same as the average of the characteristics at other locations in the direction of the wall thickness of the welded portion. Thus, comparison is made between the average grain size of the bainitic ferrite phase and/or the bainite phase at half the wall thickness of the heat-affected zone of the welded portion, and the average grain size of the bainitic ferrite phase and/or the bainite phase located 1 mm in the wall thickness direction below the outer surface of the heat-affected zone of the welded portion. When the heat-affected zone has a ratio of the average grain size of the bainitic ferrite phase and/or the bainite phase located 1 mm in the wall thickness direction below the outer surface of less than 0.5 relative to the average grain size of the bainitic ferrite phase and/or the bainite phase at half the wall thickness, heating of the outer surface with induction heaters is insufficient in the downstream step of the welded portion heat treatment described later. As a result, the desired characteristics according to aspects of the present invention such as strength and toughness of the welded portion may not be attained. On the other hand, when the ratio of the average grain size of the bainitic ferrite phase and/or the bainite phase located 1 mm in the wall thickness direction below the outer surface is more than 2 relative to the average grain size of the bainitic ferrite phase and/or the bainite phase at half the wall thickness, the difference in grain size between the outer region and at half the wall thickness of the welded portion is so increased that brittle fracture occurs from coarse grains.

Based on the above discussion, in the steel microstructure located 1 mm in the wall thickness direction below the outer surface of the welded portion, particularly, below the outer surface of the heat-affected zone of the welded portion, the bainitic ferrite phase and/or the bainite phase has an average grain size of 20 µm or less, and the average grain size of the bainitic ferrite phase and/or the bainite phase located 1 mm in the wall thickness direction below the outer surface of the heat-affected zone of the welded portion is 0.5 times or more and 2 times or less the average grain size of the bainitic ferrite phase and/or the bainite phase at half the wall thickness of the heat-affected zone of the welded portion. The ratio is preferably 0.8 or more and 1.8 or less.

In accordance with aspects of the present invention, a welded portion where the coarsening of the steel microstructure in the outer surface of the steel pipe is being prevented is obtained by welded portion heat treatment described later. Specifically, the steel microstructure located 1 mm in the wall thickness direction below the outer surface of the heat-affected zone of the welded portion attains substantially the same level of toughness as other locations in the wall thickness direction of the welded portion by controlling of the above average grain size to 20 µm or less and by controlling of the grain size ratio to 0.5 to 2. These properties of the microstructure of the welded portion may be controlled by controlling the heating temperature, the cooling rate, the cooling stop temperature and the reheating temperature in the heat treatment using induction heaters which will be described later.

The welded portion according to aspects of the present invention is obtained as described above while suppressing the coarsening of the microstructure in the outer region of the heat-affected zone of the welded portion, and thus attains excellent toughness as compared with a conventional welded portion having a coarse microstructure in the outer surface of the heat-affected zone of the welded portion. In accordance with aspects of the present invention, the toughness of the welded portion is desirably such that the absorbed energy in a Charpy impact test at 0° C. is 100 J or more as measured with respect to a region in the vicinity of the outer surface that is liable to brittle fracture. The absorbed energy is more preferably 200 J or more. Here, the "region in the vicinity of the outer surface" means a region in the heat-affected zone of the welded portion that extends from a location 1 mm in the wall thickness direction below the outer surface of to a location 11 mm in the wall thickness direction below the outer surface of the welded portion, and extends 2 mm and 4 mm from the weld junction in the circumferential direction.

In accordance with aspects of the present invention, the average grain size described hereinabove may be measured by the method described later in EXAMPLES.

The electric resistance welded steel pipe according to aspects of the present invention may be suitably used as a line pipe.

When applied to a line pipe, the steel material is preferably a steel material having a wall thickness of 12 to 25 mm. The steel material preferably has high toughness with a fracture appearance transition temperature vTrs of −45° C. or below as measured by a Charpy impact test. To attain this toughness, for example, the steel microstructure in the base steel portion of the electric resistance welded steel pipe according to aspects of the present invention preferably includes a bainitic ferrite phase and/or a bainite phase in a total area ratio of 95% or more. When the bainitic ferrite phase and/or the bainite phase represents less than 95%, the area ratio of hard martensitic phase described hereinabove is increased to give rise to a risk that toughness may be lowered.

Next, a method for manufacturing an electric resistance welded steel pipe according to an embodiment of the present invention will be described.

The electric resistance welded steel pipe according to aspects of the present invention may be obtained by performing a pipe production step in which a steel material (a hot-rolled steel strip or a hot-rolled steel plate) is formed and electric resistance welded, and subsequently performing a welded portion heat treatment in which a welded portion of the steel pipe obtained is heat-treated.

For example, a steel material may be formed and electric resistance welded, and the steel pipe may be subjected to a welded portion heat treatment in which the outer surface of a welded portion is heated to a temperature of 1000° C. or above and 1400° C. or below, the welded portion is then cooled at an average cooling rate of 20° C./sec or more and 200° C./sec or less until the temperature of the outer surface of the welded portion reaches a cooling stop temperature of $Ac_1$ transformation temperature or below, and thereafter the outer surface of the welded portion is reheated to a temperature of 900° C. or above and 1120° C. or below.

Details will be described below. In the following description of the manufacturing method, the unit "° C." for temperatures indicates the surface temperatures of a slab, a steel plate and a welded portion unless otherwise specified. These surface temperatures may be measured with a device such as, for example, a radiation thermometer. The temperatures at half the wall thickness (at a location corresponding to ½ wall thickness) of a slab, a steel plate and a welded portion may be measured by, for example, attaching a thermocouple to the center of the wall thickness of the steel plate, or by calculating the temperature distribution in a cross section of the steel plate by heat transfer analysis and correcting the results with the surface temperature of the steel plate.

In accordance with aspects of the present invention, the steel material may be manufactured by any method without limitation. For example, the steel material may be preferably obtained as follows. Molten steel having the above-described chemical composition is obtained by a known steel-making method such as a converter or an electric furnace, and is cast into cast steel such as slab having a predetermined size by a known casting method such as a continuous casting method or an ingot making-slabbing method. Next, the slab is heated under predetermined conditions, hot-rolled, and cooled to give a steel material (a hot-rolled steel plate or a hot-rolled steel strip).

In order to obtain the steel microstructure according to aspects of the present invention described hereinabove, for example, it is preferable to use a steel material obtained by a process in which a slab is heated to a temperature of 1100 to 1280° C., then hot rolled by rough rolling and finish rolling with an accumulated rolling reduction ratio of 20% or more in the non-recrystallization temperature range of $Ar_3$ transformation temperature and above and 930° C. and below, and, immediately after the finish rolling is completed, the steel is cooled to a cooling stop temperature of 650° C. or below at the center location of the wall thickness with an average cooling rate in the range of 10 to 100° C./s. After cooling, the steel may be further coiled under conditions of 300° C. to 650° C. and gradually cooled.

In the pipe production step, the steel material is formed and electric resistance welded. FIG. 1 illustrates an example of the steel pipe production step in accordance with aspects of the present invention. In the example illustrated in FIG. 1, a hot-rolled steel strip is used as the steel material.

As illustrated in FIG. 1, a coiled steel strip (a hot-rolled steel strip) 5 is uncoiled, straightened with levelers 6, and cold intermediate-formed using a plurality of cage rolls 7 into an open pipe having a substantially circular cross section. The open pipe is finish-formed with a plurality of fin pass rolls 8. After finish-forming, electric resistance welding is performed in which butt portions of the steel strip 5 in the circumferential direction are heated to the melting point or above with a welding machine 10 and are electric resistance welded while pressing the opposed end faces of the open pipe with squeeze rolls 9. A steel pipe (an electric resistance welded steel pipe) 1 is thus produced. The electric resistance welding (the welding) is not limited to the above electric resistance welding, and high-frequency induction heating welding may be adopted. The facility for manufacturing the steel pipe 1 used in the pipe production step according to aspects of the present invention is not limited to the manufacturing facility illustrated in FIG. 1.

The welded steel pipe 1 is immediately sent to a heat treatment facility.

FIG. 2 illustrates an example of the heat treatment facility for performing heat treatment (welded portion heat treatment) on the welded portion of the steel pipe in accordance with aspects of the present invention. As illustrated in FIG. 2, the heat treatment facility includes a heating device (for example, an induction heater; in the example illustrated in FIG. 2, a first induction heater 12a and a second induction heater 12b are sequentially arranged from the exit side of the pipe production step) installed so as to face the outer surface of the welded portion of the steel pipe 1, and a water-cooling device (in the example illustrated in FIG. 2, a first water-cooling device 13 and a second water-cooling device 14). The steel pipe 1 travels in the traveling direction indicated by arrow F in FIG. 2.

The welded portion is heated with the induction heaters while selecting the frequency of the heaters from the range of 100 Hz to 1000 Hz. The frequency may be selected appropriately in accordance with the characteristics of the electric resistance welded steel pipe. While a high frequency enables induction heating with high heating efficiency, the current penetration depth is small and heating is concentrated on the outer surface of the welded portion. Thus, a plurality of induction heaters is used, and the terminals of the heaters are arranged in the longitudinal direction of the steel pipe while providing a free running distance between the terminals (that is, between the adjacent induction heaters). In this manner, the heat at the outer surface of the welded portion being heated is diffused to the surroundings by thermal conduction to prevent overheating of the outer surface of the welded portion. The free running distance is not limited as long as the heat at the heated region is sufficiently diffused and the temperature, particularly of the inner surface of the welded portion, is increased. To obtain such an effect, the free running distance is preferably selected from the range of about several hundreds of mm to several thousands of mm. A water-cooling device having water cooling nozzle headers is provided in at least one location between the terminals. The welded portion heat treatment according to aspects of the present invention is divided by the installation of this water-cooling device. Heating with an induction heater upstream of this installation is the upstream step (the heating step), and reheating with a downstream induction heater is the downstream step (the reheating step).

In the example illustrated in FIG. 2, two induction heaters (the first induction heater 12a and the second induction heater 12b) are used, the first water-cooling device 13 is provided between the terminals of these heaters, and the second water-cooling device 14 is provided on the exit side of the second induction heater 12b. Heating with the first induction heater 12a is the upstream step. Cooling with the first water-cooling device 13 in the middle of heating is the cooling step. Heating (reheating) with the second induction heater 12b and cooling (quenching) with the second water-cooling device 14 are the downstream step.

In the welded portion heat treatment process, the welded portion of the steel pipe 1 is heated, cooled and quenched in this order using the heat treatment facility illustrated in FIG. 2.

The reasons why the conditions for the welded portion heat treatment are limited will be described below.

<Heating>

Heating temperature for welded portion: 1000° C. or above and 1400° C. or below in terms of the temperature of the outer surface of the welded portion When the welded portion of the steel pipe is heated with an induction heater installed on the outer surface side of the welded portion, a temperature difference is inevitably generated between the outer surface side and the inner surface side of the welded portion. When, in particular, the inner surface of the welded portion is to be heated to the $Ac_3$ transformation temperature, it is necessary to heat the outer surface of the welded portion to a temperature of 1000° C. or above. In the upstream step with an induction heater (the first induction heater 12a in the example illustrated in FIG. 2), a higher heating temperature is acceptable because any coarse microstructure may be refined by heat treatment downstream of the upstream step. When the temperature exceeds 1400° C., however, part of the heated region starts to melt and a microstructure principally including a fine bainitic ferrite phase and/or a fine bainite phase may not be obtained even after the heat treatment in the downstream step. As a result, the toughness of the welded portion is deteriorated. Thus, the heating temperature in the upstream step is limited to 1000° C. or above and 1400° C. or below in terms of the temperature of the outer surface of the welded portion. The heating temperature is preferably 1050° C. or above, and is preferably 1350° C. or below. Here, the "heating temperature" indicates the maximum heating temperature when the outer surface of the welded portion reaches the highest temperature.

To ensure that the temperature of the outer surface of the welded portion will be efficiently elevated to 1000° C. or above, heating in the upstream step is preferably performed 2 to 4 times. When heating is performed a plurality of times, a free running distance is provided between the heaters to ensure that, for example, the heat on the outer surface side that has been applied by a heating operation is sufficiently transferred to the inner surface side.

Cooling of welded portion: Average cooling rate of 20° C./sec or more and 200° C./sec or less, and cooling stop temperature of $Ac_1$ transformation temperature or below in terms of the temperature of the outer surface of the welded portion Immediately after the completion of the upstream step, the welded portion heated in the upstream step is cooled by application of water from the first water-cooling device 13 onto the outer surface of the welded portion. When the cooling is stopped at a temperature of the outer surface of the welded portion higher than the $Ac_1$ transformation temperature, the austenite phase is not transformed into a bainitic ferrite phase and/or a bainite phase and consequently the steel microstructure of the welded portion is not refined after heating (reheating) with an induction heater in the downstream step. On the other hand, when the cooling stop temperature is low, the temperature of the inner surface of the welded portion does not reach the $Ac_3$ transformation temperature or above after heating with an induction heater in the downstream step, and consequently there is a risk that the above-described steel microstructure of the welded portion may not be obtained. Thus, the cooling stop temperature is preferably limited to 400° C. or above in terms of the temperature of the outer surface of the welded portion. That is, the temperature of the outer surface of the welded portion at the termination of cooling in the cooling step is equal to or less than the $Ac_1$ transformation temperature. The cooling stop temperature is preferably 700° C. or below, and more preferably 650° C. or below. The cooling stop temperature is preferably 400° C. or above, more preferably 500° C. or above, and even more preferably 550° C. or above.

When the average cooling rate for the outer surface of the welded portion in the cooling step is less than 20° C./sec, the inner surface of the welded portion is cooled by thermal conduction at an average cooling rate of less than 10° C./sec and the steel microstructure of the welded portion after cooling becomes a ferrite-pearlite phase. As a result, the welded portion fails to attain the desired levels of strength and toughness characteristics in accordance with aspects of the present invention. On the other hand, when the average cooling rate is more than 200° C./sec, the cooling is so rapid and is unstable to cause the welded portion to attain uniform characteristics in the longitudinal direction. Thus, the average cooling rate for the outer surface of the welded portion in the cooling step is limited to 20° C./sec or more and 200° C./sec or less. The average cooling rate is preferably 50° C./sec or more and is preferably 100° C./sec or less.

Heating temperature (reheating temperature) for welded portion: 900° C. or above and 1120° C. or below in terms of the temperature of the outer surface of the welded portion In the downstream step after the cooling step, the temperature of the inner surface of the welded portion is increased by heating (reheating) the outer surface of the welded portion with an induction heater. During this process, when the heating temperature for the outer surface of the welded portion is less than 900° C., heat is not sufficiently transferred to the inner surface of the welded portion to fail to increase the temperature of the inner surface of the welded portion to the target temperature. In order to obtain the desired characteristics in accordance with aspects of the present invention, this target temperature of the inner surface is preferably 920 to 1050° C. On the other hand, when the heating temperature is higher than 1120° C., the steel microstructure in the outer surface of the welded portion becomes coarse, and the welded portion fails to attain the desired level of toughness in accordance with aspects of the present invention. Thus, the heating temperature in the downstream step is limited to 900° C. or above and 1120° C. or below in terms of the temperature of the outer surface of the welded portion. Here, the "heating temperature (reheating temperature)" indicates the maximum heating temperature when the outer surface of the welded portion reaches the highest temperature.

In this process, having the heating temperature reached at the inner surface of the welded portion equal to or higher than the $Ac_3$ transformation temperature to convert the quenched microstructure formed by welding to a fine microstructure and thereby to attain further enhancements in toughness and strength. Thus, the heating temperature in the downstream step is preferably such that the temperature of the inner surface of the welded portion becomes equal to or higher than the $Ac_3$ transformation temperature. The heating temperature is preferably 1000° C. or below.

To ensure that the inner surface of the welded portion will be efficiently reheated to the $Ac_3$ transformation temperature or above, heating in the downstream step is preferably performed 2 to 5 times. When reheating is performed a plurality of times, a free running distance is provided between the heaters to ensure that, for example, the heat on the outer surface side that has been applied by a heating operation is sufficiently transferred to the inner surface side.

After being heated (reheated), the welded portion is quenched. The quenching treatment is performed under conditions in which the average cooling rate for the outer surface of the welded portion is 20° C./sec or more and 70° C./sec or less, and the cooling stop temperature is 300° C. or above and 550° C. or below.

When the average cooling rate for the outer surface of the welded portion in the cooling step is less than 20° C./sec, the inner surface of the welded portion is cooled by thermal conduction at an average cooling rate of less than 10° C./sec, and the steel microstructure of the welded portion after cooling becomes a ferrite-pearlite phase. As a result, the welded portion fails to attain the desired levels of strength and toughness characteristics in accordance with aspects of the present invention. On the other hand, when the average cooling rate is more than 70° C./sec, the cooling is so rapid and gives rise to a martensitic phase that hinders obtaining the desired toughness. Thus, the average cooling rate for the outer surface of the welded portion in the cooling step is limited to 20° C./sec or more and 70° C./sec or less. The average cooling rate is preferably 30° C./sec or more, and is preferably 50° C./sec or less. If the cooling stop temperature is lower than 300° C., a martensitic phase is generated and the desired toughness may not be obtained. When the cooling stop temperature is higher than 550° C., precipitated particles such as carbonitrides become coarse to give rise to a decrease in strength of the welded portion including the heat-treated portion, making it impossible to obtain the desired tensile strength. Thus, the cooling stop temperature for the outer surface of the welded portion in the cooling step is limited to 300° C. or above and 550° C. or below. The cooling stop temperature is preferably 350° C. or above and 450° C. or below.

As a result of the welded portion heat treatment described above, the steel microstructure of the welded portion is principally composed of a bainitic ferrite phase and/or a bainite phase. Further, the welded portion heat treatment suppresses the coarsening of the steel microstructure of the surface layer portion of the outer surface of the welded portion. The steel microstructure of the welded portion may be controlled by controlling the heating temperature, the average cooling rate, the cooling stop temperature and the reheating temperature in the above-described welded portion heat treatment using induction heaters.

As described above, aspects of the present invention enhance the toughness of the outer surface of the welded portion by designing the heat-affected zone of the welded portion so that the steel microstructure principally includes a bainitic ferrite phase and/or a bainite phase, and by suppressing the coarsening of the microstructure in the surface layer portion of the outer surface of the welded portion. As a result, the electric resistance welded steel pipe that is obtained attains enhanced toughness in the entirety of the welded portion.

Further, in accordance with aspects of the present invention, the outer surface of the welded portion is heated to a high temperature in order to increase the amount of heat transferred to the inner surface of the welded portion. The inner surface of the welded portion may be heated to the target temperature because the heat treatment in the downstream step described above may suppress the coarsening of the microstructure in the outer surface of the welded portion, thus ensuring the quality of the welded portion.

EXAMPLES

Hereinafter, aspects of the present invention will be further described based on EXAMPLES.

Steel materials used herein are hot-rolled steel plates that have the chemical compositions described in Table 1. The hot-rolled steel plate was continuously formed into an open pipe with cage rolls 7 and fin pass rolls 8 illustrated in FIG. 1. Next, the end faces of the open pipe opposed to each other were heated to the melting point or above by high-frequency resistance heating, and were pressure-welded with squeeze rolls 9 to give a steel pipe 1.

The welded portion of the steel pipe 1 thus obtained was subjected to welded portion heat treatment under the conditions described in Table 2. An electric resistance welded steel pipe was thus manufactured. In this example, a heat treatment facility illustrated in FIG. 2 was provided in-line on the exit side of an electric resistance welded steel pipe manufacturing facility illustrated in FIG. 1. The heat treatment facility had a plurality of induction heaters (induction heating devices) arranged to face the outer surface of the pipe, and also had cooling devices having nozzle headers directed to the outer surface of the steel pipe, which were arranged one in between the induction heating devices and one on the exit side of the downstream induction heating device.

The $Ac_3$ transformation temperature and the $Ac_1$ transformation temperature described in Table 2 were calculated using the following equations based on the chemical composition of the hot-rolled steel plate described in Table 1.

$Ac_3$ transformation temperature (° C.)=937.2−436.5×C (%)+56×Si (%)−19.7×Mn (%)−16.3×Cu (%)−26.6×Ni (%)−4.9×Cr (%)+38.1×Mo (%)+124.8×V (%)+136.3×Ti (%)−19.1×Nb (%)+198.4×Al (%)+3315×B (%)

$Ac_1$ transformation temperature (° C.)=750.8−26.6×C (%)+17.6×Si (%)−11.6×Mn (%)−22.9×Cu (%)−23×Ni (%)+24.1×Cr (%)+22.5×Mo (%)−39.7×V (%)−5.7×Ti (%)+232.4×Nb (%)−169.4×Al (%)−894.7×B (%)

The chemical symbols in the equations represent the contents (mass %) of the elements, and indicate 0 when the element is absent.

Next, test specimens were sampled from the welded portions of the electric resistance welded steel pipes 1, and were subjected to (1) microstructure observation and (2) Charpy impact test. The observation method and the test method were as follows.

(1) Microstructure Observation

From the welded portion of the electric resistance welded steel pipe 1, test specimens for microstructure observation were sampled so that a cross section in the pipe axis direction would be observed. The observation faces were of "several locations (here, ¼ wall thickness t and ¾ wall thickness t) in the wall thickness direction except the central portion in the wall thickness direction of the welded portion", "half the wall thickness of the welded portion" and "1 mm below the outer surface of the welded portion".

The area ratios of the bainitic ferrite phase and the bainite phase were determined by observing the observation face with a scanning electron microscope. The test specimen for microstructure observation was etched with a Nital etching solution (3 mL nitric acid, 97 mL ethanol), and three fields of view of the microstructure were captured with a scanning electron microscope (×1000). Next, the average area ratio of the bainitic ferrite phase and that of the bainite phase were calculated using an image analyzer, thereby determining the area ratios (%) of the respective phases. The area ratios obtained here are the averages of the three fields of view. The total of the area ratios of the bainitic ferrite phase and the bainite phase is described in Table 3 as the "total area ratio (%) of the bainitic ferrite phase and/or the bainite phase at half the wall thickness".

Further, phases other than the bainitic ferrite phase and the bainite phase were observed with a scanning electron microscope in the similar manner. The average area ratios were calculated of a martensitic phase, a pearlite phase and other microstructures (such as cementite), and were combined to give the total area ratio (%). The total area ratio thus obtained of the microstructures other than the bainitic ferrite phase and the bainite phase is described in Table 3 as the "total area ratio (%) of remainder steel microstructures at half the wall thickness".

Next, the average grain size of the bainitic ferrite phase and the bainite phase was measured as follows. The orientations of crystal grains were determined by an EBSD (electron back scatter diffraction) method, and grain boundaries formed by adjacent crystal grains having an misorientation (a rotation angle) of 15° or more were identified. The average grain size of the phases was determined by the method specified in JIS G0551. The values obtained are described in Table 3. Here, the average grain size was measured at "1 mm below the outer surface of the welded portion" and "half the wall thickness of the welded portion".

(2) Charpy Impact Test

Test specimens were sampled from the welded portion of the electric resistance welded steel pipe 1. Specifically, 10 mm square full-size V-notch test specimens were sampled from regions extending from a location 1 mm in the wall thickness direction below the outer surface of the heat-affected zone of the welded portion to a location 11 mm in the wall thickness direction below the outer surface of the heat-affected zone of the welded portion, so that the circumferential direction would be the longitudinal direction of the test specimens. The V-notch test specimens were tested by a Charpy impact test in accordance with the manual specified in ASTM A370 to determine the absorbed energy (J) at 0° C. Here, five test specimens were tested, and the results were averaged. The average value obtained is described in Table 3 as the "Charpy absorbed energy (J) at 0° C. of a region extending from a depth of 1 mm to a depth of 11 mm from the outer surface".

In the similar manner, 10 mm square full-size V-notch test specimens were sampled from half the wall thickness of the heat-affected zone of the welded portion and from regions extending from a depth of 1 mm to a depth of 11 mm from the inner surface of the heat-affected zone of the welded portion. The V-notch test specimens were tested by a Charpy impact test in accordance with the manual specified in ASTM A370 to determine the absorbed energy (J) at 0° C. Five test specimens were tested, and the results were averaged. The values of absorbed energy (J) at 0° C. measured with respect to the "regions extending from a depth of 1 mm to a depth of 11 mm from the outer surface", "half the wall thickness of the welded portion" and the "regions extending from a depth of 1 mm to a depth of 11 mm from the inner surface of the welded portion" were averaged to determine the absorbed energy (J) at 0° C. of the whole welded portion, the result being described in Table 3 as the "Charpy absorbed energy (J) at 0° C. throughout the thickness of the welded portion".

TABLE 1

| Steel plate No. | Chemical composition (mass %) | | | | | | | | | | | | | |
|---|---|---|---|---|---|---|---|---|---|---|---|---|---|---|
| | C | Si | Mn | P | S | Al | Nb | Ti | Ca | Cu | Ni | Cr | Mo | V |
| A | 0.05 | 0.18 | 1.26 | 0.012 | 0.0017 | 0.038 | 0.011 | 0.004 | — | — | — | — | — | — |
| B | 0.09 | 0.09 | 1.07 | 0.008 | 0.0005 | 0.039 | 0.048 | 0.008 | 0.0022 | — | — | 0.12 | — | 0.09 |
| C | 0.03 | 0.29 | 1.63 | 0.011 | 0.0010 | 0.044 | 0.079 | 0.018 | — | 0.38 | 0.38 | — | 0.12 | 0.03 |
| D | 0.05 | 0.22 | 1.85 | 0.012 | 0.0019 | 0.033 | 0.058 | 0.023 | 0.0022 | — | — | 0.40 | — | 0.07 |
| E | 0.12 | 0.16 | 1.11 | 0.012 | 0.0015 | 0.035 | 0.012 | 0.005 | — | — | — | — | — | — |
| F | 0.06 | 0.22 | 1.21 | 0.010 | 0.0014 | 0.032 | 0.014 | 0.006 | 0.0021 | — | — | 0.55 | — | 0.10 |
| G | 0.04 | 0.18 | 1.12 | 0.009 | 0.0011 | 0.030 | 0.110 | 0.007 | — | 0.35 | 0.37 | — | 0.11 | 0.04 |
| H | 0.03 | 0.28 | 2.10 | 0.007 | 0.0006 | 0.032 | 0.062 | 0.009 | — | — | — | 0.10 | — | 0.07 |
| I | 0.05 | 0.31 | 1.41 | 0.008 | 0.0011 | 0.033 | 0.013 | 0.006 | — | — | — | — | — | — |
| J | 0.04 | 0.20 | 1.62 | 0.011 | 0.0013 | 0.031 | 0.012 | 0.026 | — | — | — | — | — | — |
| K | 0.06 | 0.22 | 0.86 | 0.009 | 0.0028 | 0.034 | 0.051 | 0.008 | — | — | — | — | — | — |
| L | 0.04 | 0.21 | 1.44 | 0.012 | 0.0021 | 0.030 | 0.021 | 0.009 | — | — | — | — | — | — |
| M | 0.06 | 0.17 | 1.13 | 0.008 | 0.0013 | 0.012 | 0.032 | 0.012 | — | — | — | — | — | — |
| N | 0.05 | 0.06 | 1.19 | 0.013 | 0.0006 | 0.076 | 0.023 | 0.007 | — | — | — | — | — | — |
| O | 0.04 | 0.25 | 1.32 | 0.009 | 0.0010 | 0.044 | 0.013 | 0.007 | — | 0.06 | 0.05 | — | 0.48 | 0.01 |
| P | 0.05 | 0.07 | 1.21 | 0.008 | 0.0002 | 0.031 | 0.044 | 0.008 | 0.0048 | — | — | 0.14 | — | 0.06 |
| Q | 0.07 | 0.11 | 1.49 | 0.011 | 0.0016 | 0.027 | 0.055 | 0.006 | 0.0003 | — | — | 0.16 | — | 0.04 |

TABLE 2

| | | Steel pipe size | | Welded portion heat treatment conditions | | | | |
|---|---|---|---|---|---|---|---|---|
| | | | | | Heating | Cooling | | |
| Steel pipe No. | Steel plate No. | Outer diameter (mm) | Wall thickness (mm) | No. of Repetition (times) | Maximum heating temperature (° C.) for the outer surface of the welded portion | Cooling stop temperature (° C.) for the outer surface of the welded portion | $A_{C1}$ transformation temperature (° C.) | Average cooling rate (° C./sec) for the outer surface of the welded portion |
| P1 | A | 508 | 16 | 2 | 1250 | 720 | 734 | 120 |
| P2 | A | 558 | 25 | 4 | 1380 | 640 | 734 | 150 |
| P3 | A | 406 | 12 | 2 | 1340 | 700 | 734 | 50 |
| P4 | A | 610 | 20 | 4 | 1350 | 670 | 734 | 110 |
| P5 | A | 610 | 22 | 4 | 1200 | 590 | 734 | 130 |
| P6 | B | 508 | 24 | 3 | 1310 | 630 | 741 | 100 |
| P7 | B | 610 | 12 | 2 | 1130 | 650 | 741 | 120 |
| P8 | B | 558 | 20 | 2 | 1420 | 580 | 741 | 160 |
| P9 | C | 660 | 13 | 2 | 1280 | 500 | 731 | 180 |
| P10 | C | 508 | 18 | 2 | 1250 | 540 | 731 | 150 |
| P11 | D | 558 | 25 | 4 | 1340 | 620 | 747 | 170 |
| P12 | D | 406 | 12 | 2 | 1240 | 670 | 747 | 120 |
| P13 | G | 558 | 20 | 3 | 1380 | 520 | 906 | 210 |

TABLE 2-continued

| | | | | | | | | |
|---|---|---|---|---|---|---|---|---|
| P14 | E | 558 | 16 | 4 | 1430 | 640 | 879 | 160 |
| P15 | F | 610 | 20 | 4 | 1360 | 930 | 916 | 40 |
| P16 | A | 610 | 25 | 5 | 1240 | 400 | 734 | 190 |
| P17 | B | 406 | 12 | 4 | 1010 | 680 | 741 | 20 |
| P18 | C | 558 | 18 | 1 | 1060 | 710 | 731 | 40 |
| P19 | H | 508 | 12 | 2 | 1260 | 590 | 739 | 140 |
| P20 | I | 406 | 16 | 4 | 1220 | 610 | 736 | 10 |
| P21 | J | 406 | 12 | 3 | 1310 | 800 | 732 | 90 |
| P22 | K | 406 | 12 | 3 | 1260 | 500 | 749 | 100 |
| P23 | L | 508 | 14 | 3 | 1200 | 540 | 736 | 80 |
| P24 | M | 660 | 19 | 4 | 1260 | 480 | 744 | 90 |
| P25 | N | 558 | 18 | 3 | 1280 | 640 | 729 | 80 |
| P26 | O | 406 | 12 | 3 | 1240 | 610 | 742 | 120 |
| P27 | O | 610 | 25 | 4 | 1360 | 550 | 742 | 110 |
| P28 | P | 508 | 22 | 4 | 1290 | 580 | 743 | 90 |
| P29 | Q | 558 | 16 | 4 | 1250 | 660 | 744 | 80 |

| | | Welded portion heat treatment conditions | | | | |
|---|---|---|---|---|---|---|
| | | Quenching | | | | |
| | | Reheating | | | Quenching | |
| Steel pipe No. | No. of Repetition (times) | Maximum heating temperature (° C.) for the outer surface of the welded portion | Heating temperature (° C.) reached at the inner surface of the welded portion | $A_{C3}$ transformation temperature (° C.) | Average cooling rate (° C./sec) for the outer surface of the welded portion | Cooling stop temperature (° C.) for the outer surface of the welded portion |
| P1 | 3 | 1100 | 960 | 909 | 40 | 380 |
| P2 | 2 | 1080 | 930 | 909 | 50 | 310 |
| P3 | 4 | 920 | 910 | 909 | 60 | 300 |
| P4 | 2 | 1150 | 970 | 909 | 50 | 330 |
| P5 | 2 | 890 | 870 | 909 | 50 | 310 |
| P6 | 3 | 1050 | 940 | 900 | 40 | 440 |
| P7 | 2 | 980 | 930 | 900 | 60 | 480 |
| P8 | 2 | 980 | 910 | 900 | 10 | 560 |
| P9 | 2 | 990 | 920 | 910 | 30 | 450 |
| P10 | 5 | 960 | 929 | 910 | 70 | 320 |
| P11 | 3 | 1080 | 940 | 907 | 40 | 320 |
| P12 | 2 | 1120 | 1010 | 907 | 20 | 550 |
| P13 | 2 | 1090 | 950 | 745 | 30 | 530 |
| P14 | 2 | 1060 | 930 | 734 | 40 | 360 |
| P15 | 2 | 1080 | 960 | 746 | 50 | 290 |
| P16 | 1 | 1070 | 920 | 909 | 30 | 520 |
| P17 | 3 | 1020 | 930 | 900 | 40 | 450 |
| P18 | 5 | 1050 | 990 | 910 | 60 | 300 |
| P19 | 2 | 1200 | 980 | 913 | 70 | 320 |
| P20 | 2 | 1060 | 960 | 912 | 80 | 280 |
| P21 | 2 | 1020 | 980 | 908 | 50 | 570 |
| P22 | 5 | 1080 | 990 | 913 | 60 | 480 |
| P23 | 4 | 1060 | 980 | 910 | 50 | 390 |
| P24 | 2 | 1040 | 920 | 902 | 60 | 320 |
| P25 | 3 | 1050 | 930 | 911 | 40 | 330 |
| P26 | 2 | 1060 | 980 | 934 | 70 | 550 |
| P27 | 3 | 1100 | 960 | 934 | 40 | 310 |
| P28 | 4 | 1060 | 930 | 909 | 60 | 460 |
| P29 | 2 | 1040 | 930 | 893 | 50 | 360 |

TABLE 3

| | Steel microstructure and characteristics of heat-affected zone of welded portion | | | | | |
|---|---|---|---|---|---|---|
| Steel pipe No. | Phase at half the wall thickness | Total area ratio (%) of BF and/or B at half the wall thickness | Total area ratio (%) of remainder steel microstructures at half the wall thickness | Phases at depth of 1 mm from the outer surface | Average grain size (μm) of BF and/or B at depth of 1 mm from the outer surface | Average grain size (μm) of BF and/or B at half the wall thickness |
| P1 | BF | 98 | 2 | BF | 10 | 8 |
| P2 | BF | 93 | 7 | BF | 10 | 11 |
| P3 | BF | 91 | 9 | B | 20 | 10 |

TABLE 3-continued

| | | | | | | | |
|---|---|---|---|---|---|---|---|
| P4 | BF | 92 | 8 | B | 25 | 9 | |
| P5 | BF | 86 | 14 | BF | 14 | 8 | |
| P6 | BF | 95 | 5 | BF | 7 | 11 | |
| P7 | BF | 98 | 2 | BF | 6 | 7 | |
| P8 | BF | 87 | 13 | BF | 17 | 9 | |
| P9 | BF | 94 | 6 | B + BF | 16 | 9 | |
| P10 | BF | 98 | 2 | BF | 5 | 10 | |
| P11 | BF | 98 | 2 | BF | 11 | 9 | |
| P12 | BF | 96 | 4 | B | 17 | 9 | |
| P13 | BF | 82 | 18 | BF | 8 | 7 | |
| P14 | BF | 76 | 24 | BF | 10 | 9 | |
| P15 | BF | 92 | 8 | B | 34 | 18 | |
| P16 | BF | 96 | 4 | BF | 5 | 10 | |
| P17 | BF | 97 | 3 | BF | 7 | 6 | |
| P18 | BF | 96 | 4 | BF | 8 | 10 | |
| P19 | BF | 81 | 19 | B | 28 | 10 | |
| P20 | BF | 79 | 21 | B | 7 | 9 | |
| P21 | BF | 74 | 26 | BF | 22 | 11 | |
| P22 | BF | 96 | 4 | BF | 4 | 7 | |
| P23 | BF | 96 | 4 | BF | 10 | 8 | |
| P24 | BF | 93 | 7 | BF | 14 | 10 | |
| P25 | BF | 94 | 6 | BF | 13 | 11 | |
| P26 | B | 100 | 0 | B | 10 | 10 | |
| P27 | BF + B | 98 | 2 | B | 11 | 14 | |
| P28 | BF | 92 | 8 | BF | 12 | 11 | |
| P29 | BF | 93 | 7 | BF | 12 | 9 | |

Steel microstructure and characteristics of heat-affected zone of welded portion

| Steel pipe No. | Ratio of average grain size of BF and/or B at depth of 1 mm from the outer surface to average grain size at half the wall thickness | Charpy absorbed energy (J) at 0° C. of region extending from depth of 1 mm to depth of 11 mm from the outer surface | Charpy absorbed energy (J) at 0° C. throughout the thickness of the welded portion | Remarks |
|---|---|---|---|---|
| P1 | 1.3 | 180 | 320 | Inventive example |
| P2 | 0.9 | 260 | 290 | Inventive example |
| P3 | 2.0 | 120 | 310 | Inventive example |
| P4 | 2.8 | 50 | 150 | Comparative example |
| P5 | 1.75 | 70 | 120 | Comparative example |
| P6 | 0.64 | 210 | 300 | Inventive example |
| P7 | 0.86 | 280 | 350 | Inventive example |
| P8 | 1.89 | 30 | 90 | Comparative example |
| P9 | 1.78 | 160 | 280 | Inventive example |
| P10 | 0.5 | 290 | 360 | Inventive example |
| P11 | 1.22 | 200 | 310 | Inventive example |
| P12 | 1.89 | 150 | 260 | Inventive example |
| P13 | 1.14 | 60 | 130 | Comparative example |
| P14 | 1.11 | 40 | 120 | Comparative example |
| P15 | 1.9 | 40 | 60 | Comparative example |
| P16 | 0.5 | 200 | 280 | Inventive example |
| P17 | 1.2 | 250 | 270 | Inventive example |
| P18 | 0.8 | 240 | 260 | Inventive example |
| P19 | 2.8 | 20 | 60 | Comparative example |
| P20 | 0.8 | 30 | 50 | Comparative example |
| P21 | 2.0 | 30 | 40 | Comparative example |
| P22 | 0.6 | 180 | 310 | Inventive example |
| P23 | 1.3 | 200 | 290 | Inventive example |
| P24 | 1.4 | 210 | 300 | Inventive example |
| P25 | 1.2 | 160 | 270 | Inventive example |
| P26 | 1.0 | 140 | 240 | Inventive example |
| P27 | 0.8 | 180 | 280 | Inventive example |
| P28 | 1.1 | 210 | 290 | Inventive example |
| P29 | 1.3 | 220 | 290 | Inventive example |

*1. BF: Bainitic ferrite phase; B: Bainite phase; Remainder microstructure: microstructures other than bainitic ferrite phase and bainite phase As can be seen from the results described in Table 3, the welded portions of the electric resistance welded steel pipes satisfying the conditions according to aspects of the present invention attained excellent toughness not only throughout the thickness of the heat-affected zone of the welded portion but also in the outer surface of the heat-affected zone of the welded portion, in spite of the fact that the wall thickness thereof was as large as 12 to 25 mm. In contrast, the electric resistance welded steel pipes of COMPARATIVE EXAMPLES which did not satisfy the conditions according to aspects of the present invention were poor in toughness.

REFERENCE SIGNS LIST

1 STEEL PIPE
5 STEEL STRIP
6 LEVELERS
7 CAGE ROLLS

8 FIN PASS ROLLS
9 SQUEEZE ROLLS
10 WELDING MACHINE
12A, 12B INDUCTION HEATERS
13, 14 WATER-COOLING DEVICES

The invention claimed is:

1. An electric resistance welded steel pipe, wherein
the electric resistance welded steel pipe is a thick-walled electric resistance welded steel pipe and comprises a welded portion comprising a heat-affected zone having a steel microstructure principally including a bainitic ferrite phase and/or a bainite phase,
the steel microstructure at half the wall thickness of the heat-affected zone of the welded portion includes a bainitic ferrite phase and/or a bainite phase in a total area ratio of 90% or more relative to the entire microstructure at half the wall thickness of the heat-affected zone of the welded portion,
in the steel microstructure located 1 mm in the wall thickness direction below the outer surface of the heat-affected zone of the welded portion, the bainitic ferrite phase and/or the bainite phase has an average grain size of 20 µm or less, and
the average grain size of the bainitic ferrite phase and/or the bainite phase located 1 mm in the wall thickness direction below the outer surface of the heat-affected zone of the welded portion is 0.5 times or more and 2 times or less the average grain size of the bainitic ferrite phase and/or the bainite phase at half the wall thickness of the heat-affected zone of the welded portion.

2. The electric resistance welded steel pipe according to claim 1, wherein the absorbed energy in a Charpy impact test at 0° C. is 100 J or more as measured with respect to a region extending from a location 1 mm in the wall thickness direction below the outer surface of the welded portion to a location 11 mm in the wall thickness direction below the outer surface of the welded portion.

3. The electric resistance welded steel pipe according to claim 1, wherein the chemical composition of a base steel portion comprises, on mass % basis, C: 0.02 to 0.10%, Si: 0.05 to 0.30%, Mn: 0.80 to 2.00%, P: 0.030% or less, S: 0.0050% or less, Nb: 0.010 to 0.100%, Ti: 0.001 to 0.025%, and Al: 0.01 to 0.08%, the balance being Fe and incidental impurities.

4. The electric resistance welded steel pipe according to claim 2, wherein the chemical composition of a base steel portion comprises, on mass % basis, C: 0.02 to 0.10%, Si: 0.05 to 0.30%, Mn: 0.80 to 2.00%, P: 0.030% or less, S: 0.0050% or less, Nb: 0.010 to 0.100%, Ti: 0.001 to 0.025%, and Al: 0.01 to 0.08%, the balance being Fe and incidental impurities.

5. The electric resistance welded steel pipe according to claim 3, wherein the chemical composition further comprises one, or two or more selected from, on mass % basis, Cu: 0.50% or less, Ni: 0.50% or less, Cr: 0.50% or less, Mo: 0.50% or less, V: 0.10% or less, and Ca: 0.0050% or less.

6. The electric resistance welded steel pipe according to claim 4, wherein the chemical composition further comprises one, or two or more selected from, on mass % basis, Cu: 0.50% or less, Ni: 0.50% or less, Cr: 0.50% or less, Mo: 0.50% or less, V: 0.10% or less, and Ca: 0.0050% or less.

7. A method for manufacturing the electric resistance welded steel pipe of claim 1, comprising:
forming and electric resistance welding a steel material,
heating the outer surface of a welded portion to a temperature of 1000° C. or above and 1400° C. or below,
cooling the outer surface of the welded portion to $Ac_1$ transformation temperature or below at an average cooling rate of 20° C./sec or more and 200° C./sec or less, and
reheating the outer surface of the welded portion to a temperature of 900° C. or above and 1120° C. or below.

8. The method for manufacturing an electric resistance welded steel pipe according to claim 7, wherein the reheating is performed to bring the temperature of the inner surface of the welded portion to $Ac_3$ transformation temperature or above.

9. The method for manufacturing an electric resistance welded steel pipe according to claim 7, wherein the reheating is followed by quenching of the outer surface of the welded portion under conditions in which average cooling rate: 20° C./sec or more and 70° C./sec or less, and cooling stop temperature: 300° C. or above and 550° C. or below.

10. The method for manufacturing an electric resistance welded steel pipe according to claim 8, wherein the reheating is followed by quenching of the outer surface of the welded portion under conditions in which average cooling rate: 20° C./sec or more and 70° C./sec or less, and cooling stop temperature: 300° C. or above and 550° C. or below.

* * * * *